(12) United States Patent
Chiu et al.

(10) Patent No.: US 11,558,352 B2
(45) Date of Patent: *Jan. 17, 2023

(54) CYBER SECURITY PROTECTION SYSTEM AND RELATED PROACTIVE SUSPICIOUS DOMAIN ALERT SYSTEM

(71) Applicant: CyCraft Singapore Pte. Ltd., Singapore (SG)

(72) Inventors: Ming-Chang Chiu, New Taipei (TW); Hui-Ching Huang, New Taipei (TW); Pei Kan Tsung, New Taipei (TW); Ming Wei Wu, New Taipei (TW)

(73) Assignee: CyCraft Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,881

(22) Filed: Oct. 1, 2021

(65) Prior Publication Data

US 2022/0124069 A1 Apr. 21, 2022

Related U.S. Application Data

(60) Provisional application No. 63/093,546, filed on Oct. 19, 2020.

(30) Foreign Application Priority Data

Mar. 11, 2021 (TW) .................................. 110108787

(51) Int. Cl.
*H04L 9/40* (2022.01)
(52) U.S. Cl.
CPC ...... *H04L 63/0236* (2013.01); *H04L 63/0263* (2013.01); *H04L 63/145* (2013.01); *H04L 63/1416* (2013.01); *H04L 63/20* (2013.01)

(58) Field of Classification Search
None
See application file for complete search history.

(56) References Cited

U.S. PATENT DOCUMENTS

2016/0036850 A1* 2/2016 Merza .................. A61G 17/042
726/22
2020/0120144 A1* 4/2020 Yadav ................ G06Q 20/4016
(Continued)

FOREIGN PATENT DOCUMENTS

TW I455546 B 10/2014
TW I478561 B 3/2015
(Continued)

OTHER PUBLICATIONS

Thome, DNS Crisis Declassified, Jul. 9, 2016, https://www.ithome.com.tw/guest-post/106780, p. 8 of the Patent Specification.

*Primary Examiner* — Joseph P Hirl
*Assistant Examiner* — Hassan Saadoun
(74) *Attorney, Agent, or Firm* — Hauptman Ham, LLP (57) ABSTRACT

A cyber security protection system includes a plurality of threat information updating devices; and a proactive suspicious domain alert system, which including: a domain information monitoring device; a domain information storage device; and a security threat analysis device, arranged to operably communicate data with the plurality of threat information updating devices through a network. If the domain information monitoring device detects that a domain mapping of a suspect domain is changed and the new domain mapping of the suspect domain points to a predetermined local address, the domain information monitoring device would further monitor a domain mapping variation frequency of the suspect domain. If the domain mapping variation frequency of the suspect domain exceeds a predetermined value, the security threat analysis device adds the suspect domain into an alert list to render the plurality of (Continued)

threat information updating devices to block their member devices from accessing the suspect domain.

6 Claims, 5 Drawing Sheets

(56) References Cited

U.S. PATENT DOCUMENTS

| | | | |
|---|---|---|---|
| 2020/0259933 A1* | 8/2020 | Goodyear | G06N 20/00 |
| 2021/0203676 A1* | 7/2021 | Pendse | H04L 63/1483 |
| 2021/0258325 A1* | 8/2021 | Meyer | H04L 63/145 |
| 2021/0360022 A1* | 11/2021 | Merza | A61G 17/042 |

FOREIGN PATENT DOCUMENTS

| | | | |
|---|---|---|---|
| TW | I524207 B | 3/2016 | |
| TW | 201902174 A | 1/2019 | |
| TW | I656778 B | 4/2019 | |
| TW | I677209 B | 11/2019 | |
| TW | 202009767 A | 3/2020 | |
| TW | M594841 | * 5/2020 | H04L 12/70 |

* cited by examiner

CYBER SECURITY PROTECTION SYSTEM AND RELATED PROACTIVE SUSPICIOUS DOMAIN ALERT SYSTEM

CROSS-REFERENCE TO RELATED APPLICATIONS

This application claims the benefit of priority to Patent Application No. 110108787, filed in Taiwan on Mar. 11, 2021; the entirety of which is incorporated herein by reference for all purposes.

This application claims the benefit of priority to U.S. Provisional Application Ser. No. 63/093,546, filed on Oct. 19, 2020; the entirety of which is incorporated herein by reference for all purposes.

BACKGROUND

The disclosure generally relates to a cyber security protection technology and, more particularly, to a cyber security protection system and a related proactive suspicious domain alert system.

As various network applications become more popular, cyber attack events occur frequently everywhere. There are various approaches of cyber attack. One typical cyber attack approach is that hackers utilize phishing emails, phishing websites, or phishing texts to lure users to connect user devices (e.g., various computers, phones, or the like) to a malicious domain through networks. Another typical cyber attack approach is that hackers utilize trojan implanted in user devices to secretly connect the user devices to the malicious domain through networks without the users being aware, so as to download malicious program codes for further attacks, or for stealing various information from the user devices.

In order to launch the aforementioned cyber attack, the hackers need to register a new domain or steal the access authority of a registered domain. Many malicious domain detecting technologies or information sharing mechanisms have been developed to detect malicious domains which have been utilized to conduct cyber attack by the hackers for several times, and provide information of the malicious domains to related cyber security protection utilities, so that the cyber security protection utilities can block the user devices from accessing the known malicious domains.

However, the existing malicious domain detecting mechanisms usually cannot determine that a domain is a malicious domain until the domain has been involved in cyber attacks for many times. Such determining mechanism has an obvious blind spot and needs to wait for a lot of time, and thus the cyber attacks launched by the hackers are difficult to effectively suppressed. Accordingly, it is difficult to provide effective proactive security protection to the network application environments.

SUMMARY

An example embodiment of a cyber security protection system is disclosed. The cyber security protection system, comprising: a plurality of threat information updating devices, arranged to respectively monitor networking behaviors of a plurality of client network systems; and a proactive suspicious domain alert system, comprising: a domain information monitoring device, arranged to operably monitor domain mapping variation of a suspect domain; a domain information storage device, coupled with the domain information monitoring device, and arranged to operably store monitoring records generated by the domain information monitoring device; and a security threat analysis device, coupled with the domain information monitoring device and the domain information storage device, and arranged to operably conduct data transmission with the plurality of threat information updating devices through networks; wherein if the domain information monitoring device finds out that a domain mapping of the suspect domain is changed, and a new domain mapping of the suspect domain points to a predetermined local address or one of a plurality of predetermined local addresses, then the domain information monitoring device monitors a domain mapping variation frequency of the suspect domain; wherein if the domain information monitoring device determines that the domain mapping variation frequency of the suspect domain exceeds a predetermined level, then the security threat analysis device adds the suspect domain into a block list to render the plurality of threat information updating devices to block member devices within the plurality of client network systems from accessing domains in the block list.

Another example embodiment of a proactive suspicious domain alert system for providing a block list to a plurality of threat information updating devices, the plurality of threat information updating devices being respectively utilized to monitor networking behaviors of a plurality of client network systems is disclosed. The proactive suspicious domain alert system comprising: a domain information monitoring device, arranged to operably monitor a domain mapping variation of a suspect domain; a domain information storage device, coupled with the domain information monitoring device, and arranged to operably store monitoring records generated by the domain information monitoring device; and security threat analysis device, coupled with the domain information monitoring device and the domain information storage device, and arranged to operably conduct data communication with the plurality of the threat information updating devices through networks; wherein if the domain information monitoring device finds out that a domain mapping of the suspect domain is changed, and a new domain mapping of the suspect domain points to a predetermined local address or one of a plurality of predetermined local addresses, then the domain information monitoring device monitors a domain mapping variation frequency of the suspect domain; wherein if the domain information monitoring device determines that the domain mapping variation frequency of the suspect domain exceeds a predetermined level, then the security threat analysis device adds the suspect domain into the block list to render the plurality of threat information updating devices to block member devices within the plurality of client network systems from accessing domains in the block list.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
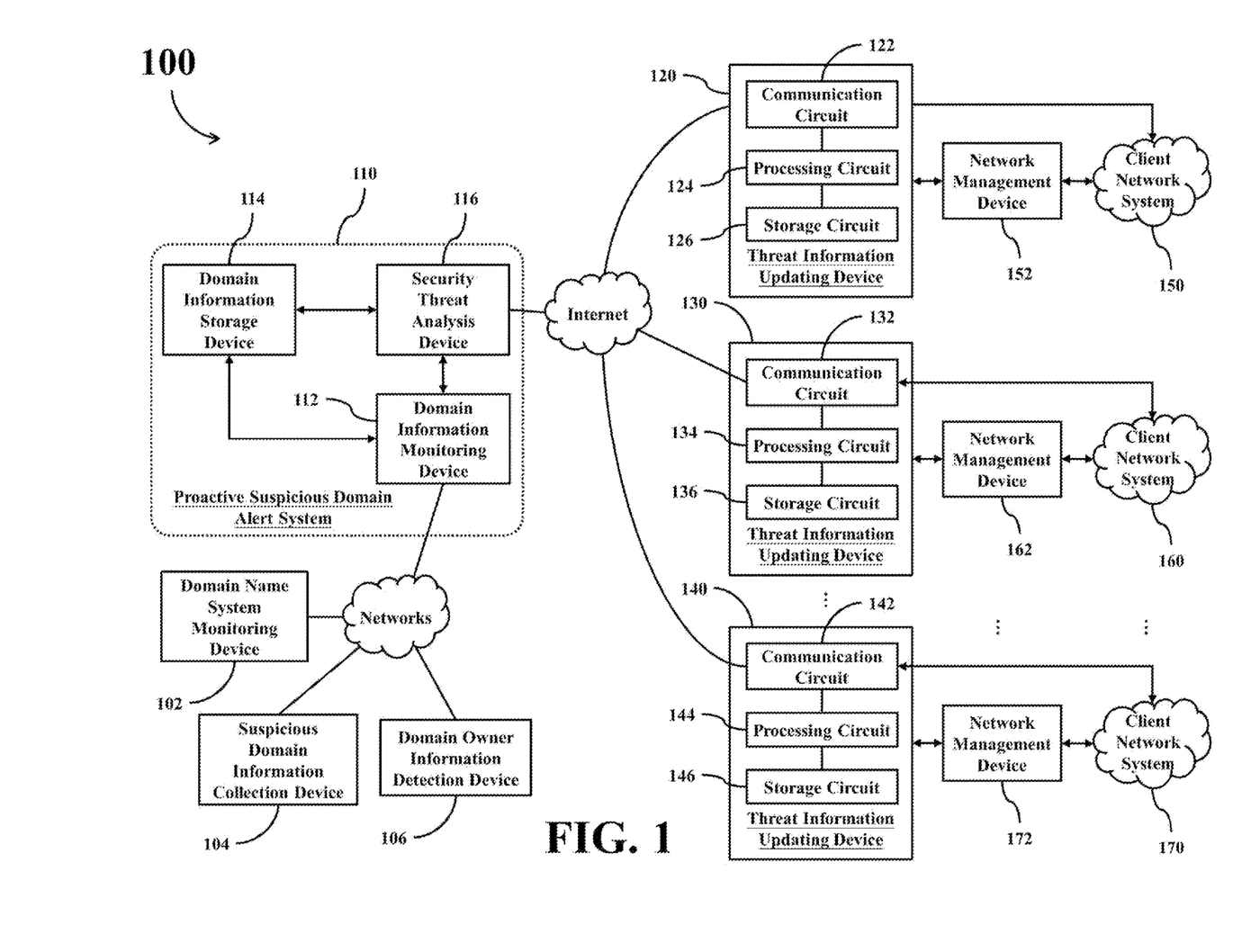
FIG. 1 shows a simplified functional block diagram of a cyber security protection system according to one embodiment of the present disclosure.

FIG. 1 shows a simplified functional block diagram of a cyber security protection system 100 according to one embodiment of the present disclosure. The cyber security protection system 100 comprises a proactive suspicious domain alert system 110 and one or more threat information updating devices. The proactive suspicious domain alert system 110 generates related domain threat intelligence for domains that may have cyber security risk, and provides the resulting domain threat intelligence to each threat information updating device. Each threat information updating device may provide related alert messages to one or more corresponding client network systems according to the domain threat intelligence generated by the proactive suspicious domain alert system 110. Each threat information updating device may cooperate with suitable network management devices to manage the network connection operations of the corresponding client network systems, so as to avoid various networking devices in the client network systems from suffering cyber attacks due to accessing domains with security risks.

For example, exemplary threat information updating devices 120, 130, and 140 are shown in the embodiment of FIG. 1. The threat information updating device 120 may cooperate with a network management device 152 to manage the network connection operation of a corresponding client network system 150; the threat information updating device 130 may cooperate with a network management device 162 to manage the network connection operation of a corresponding client network system 160; and the threat information updating device 140 may cooperate with a network management device 172 to manage the network connection operation of a corresponding client network system 170.

Please note that the quantities of the threat information updating devices, the client network systems, and the network management devices in FIG. 1 are merely for the illustrative purpose, and do not intend to limit the quantities of the aforementioned devices and the network systems in the cyber security protection system 100 to particular numbers. The quantities of the threat information updating devices, the client network systems, and the network management devices in the cyber security protection system 100 may be flexibly modified in view of requirements. For example, the threat information updating device 120 may cooperate with multiple network management devices 152 to manage the network connection operation of the client network system 150; the threat information updating device 130 may cooperate with multiple network management devices 162 to manage the network connection operation of the client network system 160; and the threat information updating device 140 may cooperate with multiple network management devices 172 to manage the network connection operation of the client network system 170.

In practical applications, the aforementioned client network systems 150, 160, and 170 may be internal network systems of enterprises, schools, research institutes, governments, or nonprofit organizations of various scales, and respectively comprise a certain quantity of member devices (not shown in FIG. 1). The quantity of the member devices of each client network system may be single-digit numbers, dozens, hundreds, or even more than one thousand. In addition, the multiple member devices of each client network system may be located in the same geographical region, or may be located in different geographical regions (e.g., different cities or countries).

The aforementioned network management devices 152, 162, and 172 may be realized with various suitable network access authority controlling devices, such as routers, network gateways, access points, or the like. Alternatively, the aforementioned network management devices 152, 162, and 172 may be realized with various suitable remote servers or computing devices configured on various cloud systems (e.g., virtual machines, computing modules, or application modules on various private cloud systems or public cloud platforms).

The term "member device" used throughout the description and the claims refers to various electronic equipment capable of executing specific operating system (e.g., Windows, Linux, macOS, Android, Chrome OS, HarmonyOS, or the like) to operate while supporting appropriate data communication protocols, such as a desktop computer, a laptop computer, a tablet computer, a server, a NAS (network attached storage), a smart television, a smart phone, a smart speaker, or the like. The aforementioned data communication protocols may be various wired transmission protocols or wireless data communication protocols, such as TCP/IP (transmission control protocol/internet protocol) communication protocols, UDP (user datagram protocol) communication protocol, IEEE 802.11 series communication protocols, Bluetooth series communication protocols, or the like.

Individual member device in each client network system may directly or indirectly communicate various data with another one or more member devices through appropriate data transmission mechanisms (e.g., an intranet or data transmission cables within the respective client network system). In operations, a part of the member devices in the client network system may employ wired data transmission approach to conduct data communications, while another part of the member devices may employ wireless data transmission approach to conduct data communications. In other words, different member devices may employ different data transmission approaches.

In the embodiment of FIG. 1, the proactive suspicious domain alert system 110 comprises a domain information monitoring device 112, a domain information storage device 114, and a security threat analysis device 116. The domain information monitoring device 112 is arranged to intermittently collect and monitor domain registration information of one or more predetermined regions, inspect the domain age of domains, and/or monitor domain mapping variation of the domains. The domain information storage device 114 is coupled with the domain information monitoring device 112, and arranged to operably store domain registration information collected by the domain information monitoring device 112 and/or monitoring records generated by the domain information monitoring device 112. The security threat analysis device 116 is coupled with the domain information monitoring device 112 and the domain information storage device 114, and arranged to operably control operations of the domain information monitoring device 112 and the domain information storage device 114. The security threat analysis device 116 is further arranged to operably generate related domain threat intelligence for domains with cyber security risk according to the domain registration information collected by the domain information monitoring device 112 and/or the monitoring records generated by the domain information monitoring device 112, and to transmit the generated domain threat intelligence to the aforementioned threat information updating devices 120, 130, and 140 through suitable networks (e.g., private networks or the internet).

The term "domain age" used throughout the description and the claims refers to a length of time that a domain has existed since its registration. In practice, the length of time may be measured by various suitable time units, such as minutes, hours, days, or the like.

In practice, each of the aforementioned domain information monitoring device 112 and security threat analysis device 116 may be realized with various single processor module, a combination of multiple processor modules, a single computer system, a combination of multiple computer systems, a single server, a combination of multiple servers, or a cloud computing system having network connecting ability, computing ability, and data processing ability. The domain information storage device 114 may be realized with various volatile storage device, a non-volatile storage device, a data base system, or a cloud storage system.

As shown in FIG. 1, the threat information updating device 120 comprises a communication circuit 122, a processing circuit 124, and a storage circuit 126. The threat information updating device 130 comprises, a communication circuit 132, a processing circuit 134, and a storage circuit 136. The threat information updating device 140 comprises a communication circuit 142, a processing circuit 144, and a storage circuit 146.

In the threat information updating device 120, the communication circuit 122 is coupled with the corresponding client network system 150 and the network management device 152, and arranged to operably conduct data transmission with the security threat analysis device 116, the network management device 152, and multiple member devices of the client network system 150 through suitable networks (e.g., the intranet of the client network system 150 or internet), so as to receive the domain threat intelligence transmitted from the proactive suspicious domain alert system 110 and the networking behavior records of the multiple member devices in the client network system 150. The processing circuit 124 is coupled with the communication circuit 122. The processing circuit 124 is arranged to operably control operations of the communication circuit 122 and process the received networking behavior records, so as to inspect domain accessing behaviors of the member devices in the client network system 150. The processing circuit 124 may also directly control (or indirectly control through the network management device 152) the domain accessing behaviors of respective member devices in the client network system 150 according to the domain threat intelligence transmitted from the proactive suspicious domain alert system 110, so as to block the respective member devices from accessing specific domains. The storage circuit 126 is coupled with the processing circuit 124, and arranged to operably store the domain threat intelligence received by the communication circuit 122 and the networking behavior records of the member devices of the client network system 150.

In practical applications, the aforementioned threat information updating device 120 may be installed inside the organization to which the client network system 150 belongs or may be installed in other geographical locations outside the organization to which the client network system 150 belongs. For example, the aforementioned threat information updating device 120 may be installed in the client network system 150 in the form of an independent hardware equipment. In some applications, for another example, the aforementioned threat information updating device 120 may be realized with various suitable remote server or a computing device configured on various cloud systems (e.g., a virtual machine, a computing module, or an application module on various private cloud systems or public cloud platforms).

Each of the other threat information updating devices in the cyber security protection system 100 (e.g., the threat information updating devices 130 and 140) may have similar main structure and configuration as the threat information updating device 120. Additionally, the operations of the main circuits of other threat information updating devices may be similar to the operations of the corresponding circuits of the threat information updating device 120, and the connections between the main circuits of other threat information updating devices may be similar to the connections between the corresponding circuits of the threat information updating device 120.

Please note that the threat information updating devices 120, 130, and 140 are not restricted to having completely the same circuit structure in practical implementations, and the operations of the respective circuits of each threat information updating device are not restricted to be completely the same as the operations of the corresponding circuits of other threat information updating devices.

In practice, each of the aforementioned communication circuits 122, 132, and 142 may be realized with various wired transmission circuit, a wireless transmission circuit, a mixed circuit integrating the above two communication mechanisms, or a cloud communication system. Each of the processing circuits 124, 134, and 144 may be realized with a single processor module, a combination of multiple processor modules, a single computer system, a combination of multiple computer systems, a single server, a combination of multiple servers, or a cloud computing system. Each of the storage circuit 126, 136, and 146 may be realized with various volatile storage device, a non-volatile storage device, a data base system, or a cloud storage system.

Figure 2:
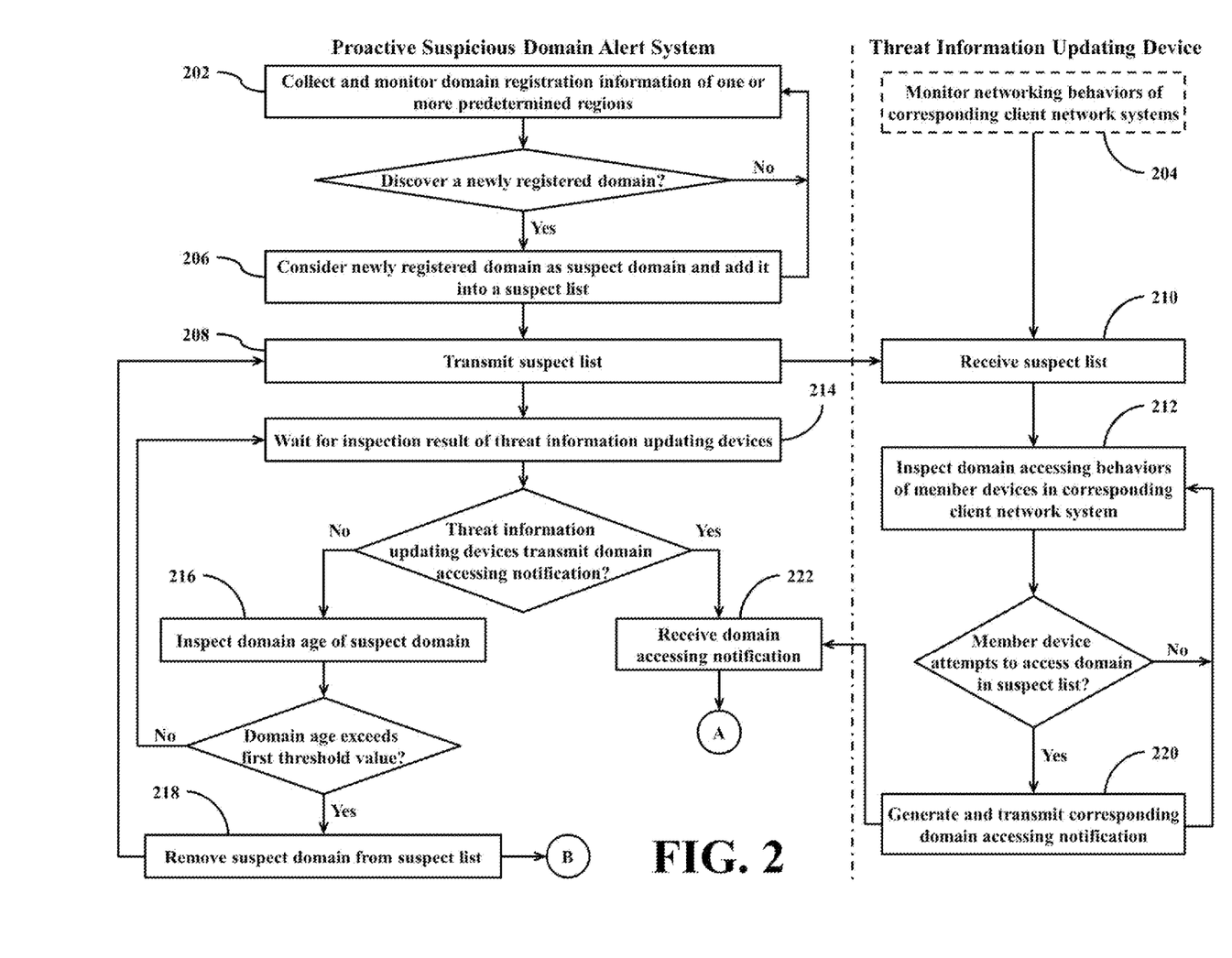
FIGS. 2-3 collectively show a simplified flowchart of a method for determining whether newly registered domains have security threats according to one embodiment of the present disclosure.
Figure 3:
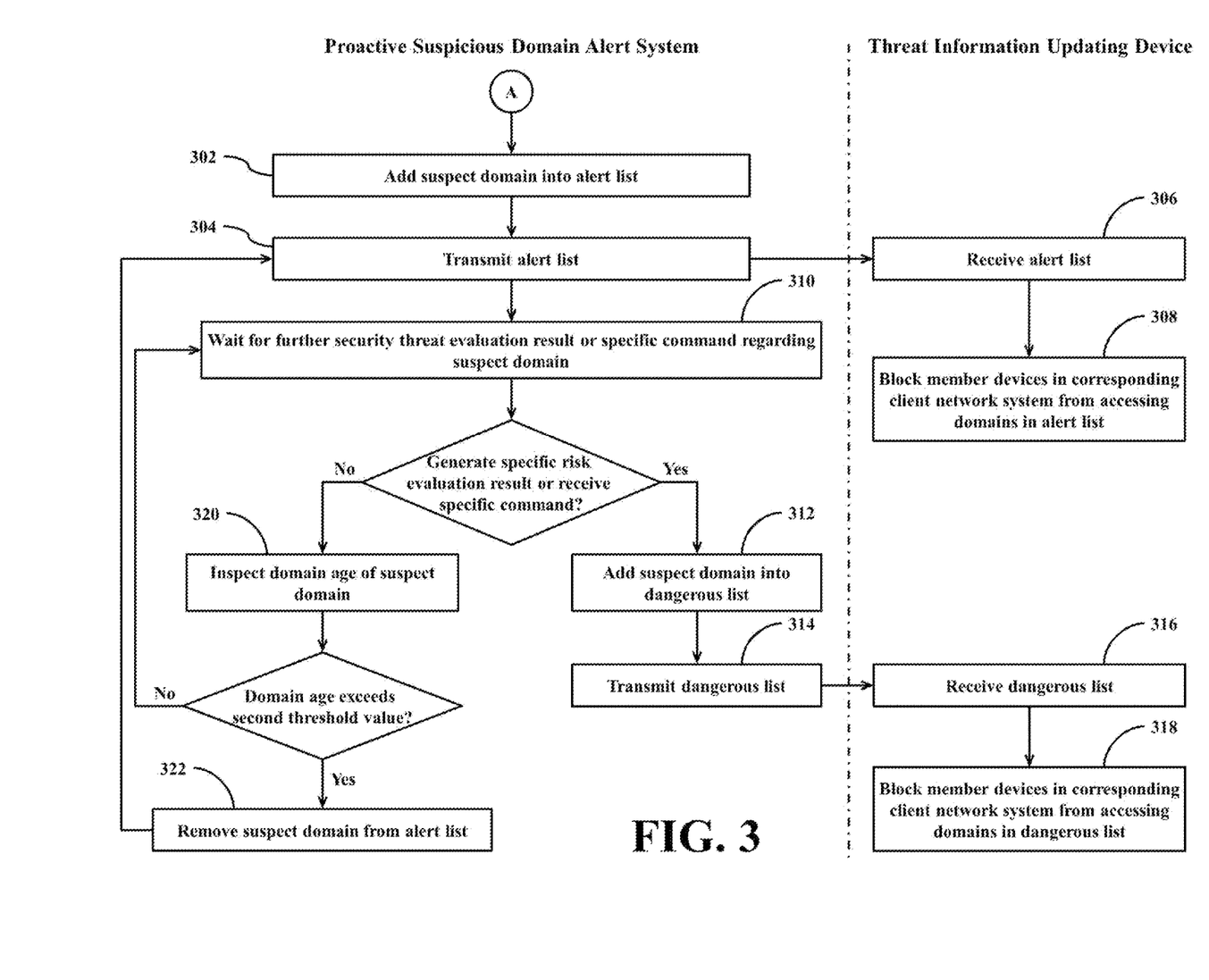

The operation of the domain threat evaluation conducted by the cyber security protection system 100 will be further described below by reference to FIG. 2 through FIG. 3. FIGS. 2-3 collectively show a simplified flowchart of a method for determining whether newly registered domains have security threats according to one embodiment of the present disclosure.

In the flowchart of FIG. 2 and FIG. 3, operations within a column under the name of a specific device are operations to be performed by the specific device. For example, operations within a column under the label "proactive suspicious domain alert system" are operations to be performed by the proactive suspicious domain alert system 110; operations within a column under the label "threat information updating device" are operations to be performed by the respective threat information updating devices 120, 130, and 140. The same analogous arrangement also applies to the subsequent flowcharts.

As shown in FIG. 2, when the cyber security protection system 100 operates, the proactive suspicious domain alert system 110 performs the operation 202, and the threat information updating devices 120, 130, and 140 may perform the operation 204 of FIG. 2.

In the operation 202, the domain information monitoring device 112 of the proactive suspicious domain alert system 110 collects and monitors the domain registration information of one or more predetermined regions. For example, the domain information monitoring device 112 may connect to websites or servers of various types of network registration management institution, so as to search for the related information of the newly registered domains in a region, in some regions, or worldwide.

For another example, the domain information monitoring device 112 may connect to one or more domain name system monitoring devices 102 through a suitable private network or the internet, so as to receive the domain registration information collected by the domain name system monitoring device 102. In practice, the aforementioned domain name system monitoring device 102 may be realized with various single processor module, a combination of multiple processor modules, a single computer system, a combination of multiple computer systems, a single server, a combination of multiple servers, or a cloud computing system having network connecting ability, computing ability, and data inspecting ability.

The aforementioned domain name system monitoring device 102 may be an equipment managed and operated by the operator and/or manager of the proactive suspicious domain alert system 110. Alternatively, the domain name system monitoring device 102 may be an equipment managed and operated by other third party service providers.

In practical applications, during the operation of the proactive suspicious domain alert system 110, the domain information monitoring device 112 may perform the operation 202 in real time or may perform the operation 202 intermittently or periodically. In general circumstances, within five to ten minutes since a new domain has registered, the domain information monitoring device 112 is enabled to obtain the related information of the newly registered domain by utilizing the aforementioned approaches.

In the operation 204, the threat information updating devices 120, 130, and 140 may respectively monitor the networking behaviors of the corresponding client network system 150, 160, and 170. For example, the threat information updating device 120 may detect and collect the networking behavior records of the respective member devices in the client network system 150. In practice, the processing circuit 124 of the threat information updating device 120 may utilize the network management device 152 or a predetermined application installed in the respective member devices of the client network system 150 to access and analyze the content of specific non-volatile data stored in the corresponding member device, such as the system logs, the processes which are automatically executed after boot up, the file execution records, and/or the meta data of files of specific types or the like. The processing circuit 124 may receive the data returned by the aforementioned specific application through the communication circuit 122.

In the case that the operating system of the member device is the Windows system, for example, the network management device 152 or the aforementioned predetermined application may access and analyze the Windows Event Logs, the Autorun Registry Schedule Jobs, the Prefetch cache, the Shimcache and/or the Amcache, and/or the meta data of PE files (portable executable files) of .exe/.dll/.sys formats, or the like stored in the member device, and transmit to the communication circuit 122 of the threat information updating device 120.

For another example, in the case that the operating system of the member device is the Linux system, the network management device 152 or the aforementioned predetermined application may access and analyze the log items under "/var/log/" directory, the Systemd, the SysV init script, the crontab, the Upstart, the dynamic web pages of .php or .jsp format, the shell scripts, the sensitive files, the command histories, the syslog, and/or the meta data of the ELF files (executable and linkable format files) of .so/.ko formats, or the like stored in the member device, and transmit to the communication circuit 122 of the threat information updating device 120.

For another example, in the case that the operating system of the member device is the macOS system, the network management device 152 or the aforementioned predetermined application may access and analyze the log items under "/var/log/" directory, the records under "/Library/LaunchAgents/" directory, the records under "/Library/LaunchDaemons/" directory, the shell scripts, the command histories, and/or the meta data of the Mach-O files (Mach object files), or the like stored in the member device, and transmit to the communication circuit 122 of the threat information updating device 120.

In addition to the aforementioned non-volatile data, the network management device 152 or the aforementioned predetermined application may detect and analyze the contents of specific volatile data of the member device in the operation 204, such as the current contents in the memory of the member device and/or the network activities of the member device, and transmit to the communication circuit 122 of the threat information updating device 120. For example, the network management device 152 or the aforementioned predetermined application may utilize a network connection inquiry command "netstat" to inquire the status of the member device regarding the connection with external networks, and may utilize various approaches to detect the domains that the member device attempts to access.

In operations, the network management device 152, the aforementioned predetermined application, or the processing circuit 124 may adopt various filtering and determination algorithms to conduct a preliminary analysis on the contents of the aforementioned specific non-volatile data and/or volatile data related to the member device, so as to filter activities records possibly associated with networking actions from numerous activities records of the member device to be networking behavior records, thereby reducing the data volume to be processed or analyzed by the processing circuit 124 in the subsequent stage.

The threat information updating devices 130 and 140 may respectively monitor the networking behaviors of the corresponding client network systems 160 and 170 by adopting the aforementioned approach of the threat information updating device 120. For the sake of brevity, the descriptions will not be repeated here. In practical applications, the threat information updating devices 120, 130, and 140 may respectively transmit the monitoring records regarding the networking actions of the client network systems 150, 160, and 170 to the proactive suspicious domain alert system 110 to conduct various analysis and determination.

When the domain information monitoring device 112 discovers a newly registered domain, the domain information monitoring device 112 may store the related information of the newly registered domain in the domain information storage device 114 and inform the security threat analysis device 116.

For example, at each time the domain information monitoring device 112 discovers a newly registered domain, the domain information monitoring device 112 may directly store the related information of the newly registered domain in the domain information storage device 114 and inform the security threat analysis device 116.

Alternatively, at each time the domain information monitoring device 112 discovers a newly registered domain, the domain information monitoring device 112 may first inspect the current domain age of the newly registered domain, and then store the related information of the newly registered domain in the domain information storage device 114 and inform the security threat analysis device 116 only if the current domain age of the newly registered domain is less than a first threshold value.

In the operation 206, the security threat analysis device 116 may consider the newly registered domain reported by the domain information monitoring device 112 as a suspect domain and add the newly registered domain into a suspect list.

In the operation 208, the security threat analysis device 116 may transmit the suspect list to the threat information updating devices 120, 130, and 140 through networks. In practice, the security threat analysis device 116 may transmit the most updated suspect list to the threat information updating devices 120, 130, and 140 in real time once the content of the suspect list changes. Alternatively, the security threat analysis device 116 may intermittently or periodically transmit the current suspect list to the threat information updating devices 120, 130, and 140.

The domain information monitoring device 112 and the security threat analysis device 116 may repeat the above operation 202 through the operation 208.

In the operation 210, the threat information updating devices 120, 130, and 140 may respectively utilize the communication circuits 122, 132, and 142 to receive the suspect list transmitted from the security threat analysis device 116.

In the operation 212, the threat information updating devices 120, 130, and 140 may respectively inspect the domain accessing behaviors of the member devices in the corresponding client network systems 150, 160, and 170, so as to determine whether any member device in the client network systems 150, 160, and 170 has tried to access the domains in the suspect list.

For example, the processing circuit 124 of the threat information updating device 120 may analyze the domain accessing behaviors of respective member devices in the client network system 150 according to the aforementioned networking behavior records of the respective member devices in the client network system 150 in the operation 212, so as to determine whether any member device in the client network system 150 has tried to access the domains in the suspect list.

For another example, the network management device 152 may duplicate every network packet between the external networks and the respective member device in the client network system 150, and transmit the duplicated packets to the communication circuit 122 of the threat information updating device 120. In the operation 212, the processing circuit 124 of the threat information updating device 120 may check the contents of the destination address fields and/or the source address fields of the aforementioned network packets, so as to determine whether the member device has tried to access the domains in the suspect list.

For yet another example, the network management device 152 may duplicate the contents of the destination address field and/or the source address field of every network packets between the respective member device in the client network system 150 and the external networks, and transmit the duplicated contents to the communication circuit 122 of the threat information updating device 120. In the operation 212, the processing circuit 124 of the threat information updating device 120 may check the contents of the aforementioned fields, so as to determine whether the member device has tried to access the domains in the suspect list.

For yet another example, the network management device 152 may check the contents of the destination address field and/or the source address field of every network packets between the respective member device in the client network system 150 and external networks, so as to determine whether the member device has tried to access the domains in the suspect list and transmit the determination result to the communication circuit 122 of the threat information updating device 120. In the operation 212, the processing circuit 124 of the threat information updating device 120 may quickly find out whether any member device in the client network system 150 has tried to access the domains in the suspect list according to the determination result transmitted from the network management device 152.

Similarly, the threat information updating device 130 may cooperate with one or more corresponding network management devices 162 to inspect the domain accessing behaviors of the member devices in the corresponding client network system 160 by adopting the aforementioned operation approach of the threat information updating device 120. Furthermore, the threat information updating device 140 may cooperate with one or more corresponding network management devices 172 to inspect the domain accessing behaviors of the member devices in the corresponding client network system 170 by adopting the aforementioned operation approach of the threat information updating device 120.

As shown in FIG. 2, after transmitting the suspect list to the threat information updating devices 120, 130, and 140, the security threat analysis device 116 performs the operation 214 to wait for the inspection result of the threat information updating devices 120, 130, and 140.

During the period in which the security threat analysis device 116 waits for the threat information updating devices 120, 130, and 140 to generate domain accessing notifications, the security threat analysis device 116 may instruct the domain information monitoring device 112 to intermittently or periodically perform the operation 216.

In the operation 216, the domain information monitoring device 112 may inspect the current domain age of the respective suspect domains in the suspect list. If the domain information monitoring device 112 finds out that the current domain age of a specific suspect domain in the suspect list does not yet exceed the aforementioned first threshold value, then the proactive suspicious domain alert system 110 may repeat the operation 214 and the operation 216. In this situation, the security threat analysis device 116 will keep the specific suspect domain in the suspect list to keep observation on the specific suspect domain.

On the contrary, if the domain information monitoring device 112 finds out that the current domain age of a specific suspect domain in the suspect list exceeds the aforementioned first threshold value, then the domain information monitoring device 112 informs the security threat analysis device 116 of the situation that the current domain age of the specific suspect domain exceeds the aforementioned first threshold value. In this situation, the security threat analysis device 116 performs the operation 218.

In the operation 218, the security threat analysis device 116 determines that the specific suspect domain does not have any obvious cyber security threat so far and removes the specific suspect domain from the suspect list. Then, the security threat analysis device 116 performs the operation 208 to transmit the updated suspect list to the threat information updating devices 120, 130, and 140.

The length of time of the aforementioned first threshold value is related to the length of observation time and the sensitivity of that the security threat analysis device 116 evaluates the domain threat risk of the suspect domain in the suspect list. In practice, the aforementioned first threshold value may be configured to have a length of time between one hour and a hundred and twenty hours, such as one and a half hour, two hours, three hours, five hours, ten hours, twelve hours, fifteen hours, eighteen hours, twenty-four hours, thirty-six hours, forty-eight hours, fifty hours, sixty hours, seventy-two hours, eighty hours, ninety-six hours, a hundred hours, or the like.

As can be appreciated from the foregoing descriptions, after the domain information monitoring device 112 discovers a newly registered domain, the newly registered domain is considered as a suspect domain and added into the suspect list for observation by the security threat analysis device 116. Before the domain age of the specific suspect domain in the suspect list exceeds the aforementioned first threshold value, the security threat analysis device 116 will keep the specific suspect domain in the suspect list for observation even if no member device in any client network system attempts to access the specific suspect domain-. In the meantime, the threat information updating devices 120, 130, and 140 does not block the corresponding client network system from accessing the specific suspect domain.

Please note that if the domain age of the specific suspect domain exceeds the first threshold value, but it is still not accessed by any member device in any client network system, then the security threat analysis device 116 removes the specific suspect domain from the suspect list. Such approach decreases the quantity of suspect domains in the suspect list, which not only decreases the computing loading, the storage requirement, and/or the memory requirement for the domain information monitoring device 112, but also decreases the computing loading, the storage requirement, and/or the memory requirement for the threat information updating devices 120, 130, and 140 when they perform the aforementioned inspecting operation in the operation 212. According to experimental tests, for example, by configuring the aforementioned first threshold value to have a length of time between one hour and seventy-two hours, the computing loadings, the storage requirements, and/or the memory requirements for the domain information monitoring device 112 and the threat information updating devices 120, 130, and 140 may be effectively decreased without significantly degrading the security protection performance of the cyber security protection system 100, and thus the aforementioned devices are enabled to have more balanced configurations on protection performance and resource usage efficiency.

On the other hand, as shown in FIG. 2, when performing the operation 212, once any of the threat information updating devices discovers that any member device in the corresponding client network system attempts to access the domain in the suspect list, the threat information updating device may perform the operation 220 to generate and transmit a corresponding domain accessing notification to the proactive suspicious domain alert system 110. In this situation, the security threat analysis device 116 performs the operation 222 to receive the domain accessing notification generated by the threat information updating device.

For illustrative purpose, it is assumed hereinafter that the processing circuit 124 of the threat information updating device 120 discovers that one or more member devices in the corresponding client network system 150 attempt to access a suspect domain SD1 in the suspect list when performing the aforementioned operation 212.

In this situation, the processing circuit 124 performs the operation 220 to generate a domain accessing notification corresponding to the suspect domain SD1, and transmits the domain accessing notification to the security threat analysis device 116 through the communication circuit 122. On the other hand, the security threat analysis device 116 performs the operation 222 to receive the domain accessing notification generated by the threat information updating device 120.

Please note that the domain age of the suspect domain SD1 does not exceed the aforementioned first threshold value at this moment, which means that the suspect domain SD1 is a newly registered domain that has been registered not long ago. In general, most normal domains will not be officially utilized in public within a reasonable length of time after registration. In addition, except the manager or owner of the newly registered domain, most of the other people in theory should not be aware of the existence of the newly registered domain exists and thus they are unlikely to utilize their own networking equipment to attempt to access the newly registered domain in general circumstances.

However, the member device of the client network system 150 has attempted to access the suspect domain SD1 before the current domain age of the suspect domain SD1 reaches the aforementioned first threshold value. This is apparently not a typical utilization pattern for a normal newly registered domain.

Therefore, after receiving the domain accessing notification corresponding to the aforementioned suspect domain SD1, the security threat analysis device 116 considers the suspect domain SD1 as a domain with cyber security risk. For example, the suspect domain SD1 may be determined to be a malicious domain utilized by hackers when conducting cyber attack by utilizing phishing emails, phishing websites, or phishing texts; the suspect domain SD1 may be determined to be a test domain utilized by hackers to test whether the trojan is successfully implanted in the member devices of the client network system 150; or the suspect domain SD1 may be determined to be a malicious domain to which malicious program codes implanted in the user device wants to connect.

In this situation, the security threat analysis device 116 performs the operation 302 of FIG. 3 to add the suspect domain SD1 into an alert list. In the meantime, the security threat analysis device 116 may remove the suspect domain SD1 from the aforementioned suspect list or may keep the suspect domain SD1 in the suspect list for a period of time.

In the operation 304, the security threat analysis device 116 may transmit the alert list to the threat information updating devices 120, 130, and 140 through networks. In practice, the security threat analysis device 116 may transmit the most updated alert list to the threat information updating devices 120, 130, and 140 immediately once the contents of the alert list are changed. Alternatively, the security threat analysis device 116 may intermittently or periodically transmit the current alert list to the threat information updating devices 120, 130, and 140.

In the operation 306, the threat information updating devices 120, 130, and 140 may respectively utilize the communication circuits 122, 132, and 142 to receive the alert list transmitted from the security threat analysis device 116.

In the operation 308, the threat information updating devices 120, 130, and 140 may block the member devices in the corresponding client network system from accessing the domains in the alert list. For example, the processing circuit 124 of the threat information updating device 120 may directly block the access authority of all of the member devices in the client network system 150 regarding the domains in the alert list, or may instruct the corresponding network management device 152 to block the access authority of all of the member devices in the client network system 150 regarding the domains in the alert list.

Similarly, the processing circuit 134 of the threat information updating device 130 may directly block the access authority of all of the member devices in the client network system 160 regarding the domains in the alert list, or may instruct the corresponding network management device 162 to block the access authority of all of the member devices in the client network system 160 regarding the domains in the alert list. The processing circuit 144 of the threat information updating device 140 may directly block the access authority of all of the member devices in the client network system 170 regarding the domains in the alert list, or may instruct the corresponding network management device 172 to block the access authority of all of the member devices in the client network system 170 regarding the domains in the alert list.

In this embodiment, even if only a single threat information updating device 120 transmits a domain accessing notification corresponding to the suspect domain SD1 to the security threat analysis device 116 while the other threat information updating devices 130 and 140 do not transmit any domain accessing notification corresponding to the suspect domain SD1 to the security threat analysis device 116, the security threat analysis device 116 still adds the suspect domain SD1 into the alert list and transmits the alert list to the threat information updating devices 120, 130, and 140, to cause the threat information updating devices 120, 130, and 140 to begin blocking the access authority of all of the member circuits in the client network systems 150, 160, and 170 regarding the suspect domain SD1.

In other words, although the suspect domain SD1 is merely found to be accessed by one or some member devices in a single client network system 150, the suspect domain SD1 would still be added into the alert list by the security threat analysis device 116, thereby causing the threat information updating devices 120, 130, and 140 to begin blocking all of the member circuits in the client network systems 150, 160, and 170 from accessing the suspect domain SD1.

Therefore, even if the suspect domain SD1 is truly a malicious domain utilized by hackers to conduct cyber attacks, a test domain utilized by hackers to test the trojan, or a malicious domain to which the malicious program codes implanted in a certain user device want to connect, it is difficult for the suspect domain SD1 to cause further damage to the other member devices in the client network systems 150, 160, and 170, since the threat information updating devices 120, 130, and 140 has begun blocking all of the member circuits in the client network systems 150, 160, and 170 from accessing the suspect domain SD1 according to the security threat intelligence (i.e., the alert list) provided by the security threat analysis device 116.

As can be appreciated from the foregoing descriptions, even if the suspect domain SD1 has been registered not long ago (as its current domain age does not yet exceed the first threshold value), the security threat analysis device 116 would add the suspect domain SD1 into the alert list as long as any threat information updating device discovers that any member device in any client network system attempts to access the suspect domain SD1, so as to significantly bring forward the time point that the threat information updating devices 120, 130, and 140 start to block the client network systems 150, 160, and 170 from accessing the suspect domain SD1.

As a result, it could create an obstacle for the cyber attacks conducted by hackers by utilizing the newly-registered suspect domain SD1, thereby effectively increasing the difficulty for the hackers to conduct cyber attacks.

From another aspect, the aforementioned proactive suspicious domain alert system 110 may provide proactive cyber security protection to the client network systems 150, 160, and 170, thereby improving the cyber security protection level for the client network systems 150, 160, and 170.

Obviously, the aforementioned cyber security protection mechanism will force the hackers to register more domains to use, so it can significantly increase the hackers' cost in implementing cyber attacks, thereby reducing the possibility of cyber attacks launched by the hackers.

As shown in FIG. 3, after transmitting the alert list to the threat information updating devices 120, 130, and 140, the security threat analysis device 116 then performs the operation 310 to wait for a further security threat evaluation result or a specific command regarding the suspect domains in the alert list.

For illustrative purpose, the suspect domain SD1 that was added into the alert list will be taken as an example for description in the following.

For example, the security threat analysis device 116 may adopt various suitable algorithms or statistic approaches to further evaluate the security risk of the suspect domain SD1 according to the domain information recorded in the domain information storage device 114 or the networking behavior records of the client network systems 150, 160, and 170 collected by the threat information updating devices 120, 130, and 140.

For another example, the domain information monitoring device 112 may connect to one or more suspicious domain information collection devices 104 through a suitable private network or the internet, so as to inquire whether the suspect domain SD1 is determined as a suspect domain by other security threat evaluation organizations or security protection service providers, and may report the inquiry result to the security threat analysis device 116 so that the security threat analysis device 116 can conduct further evaluation on the security risk of the suspect domain SD1. In practice, the aforementioned suspicious domain information collection device 104 may be realized with various single processor module, a combination of multiple processor modules, a single computer system, a combination of multiple computer systems, a single server, a combination of multiple servers, or a cloud computing system having network connecting ability, computing ability, and data responding ability.

For yet another example, the domain information monitoring device 112 may connect to one or more domain owner information detection devices 106 through a suitable private network or the internet, so as to inspect the domain owner information of the suspect domain SD1, and may report the inspection result to the security threat analysis device 116. The security threat analysis device 116 may combine the domain owner information of the suspect domain SD1 with other various network security information to further evaluate the security risk of the suspect domain SD1. In practice, the aforementioned domain owner information detection device 106 may be realized with various single processor module, a combination of multiple processor modules, a single computer system, a combination of multiple computer systems, a single server, a combination of multiple servers, or a cloud computing system having network connecting ability, computing ability, and data responding ability.

The aforementioned suspicious domain information collection device 104 and/or the domain owner information detection device 106 may be an equipment managed and operated by the operator and/or manager of the proactive suspicious domain alert system 110. Alternatively, the suspicious domain information collection device 104 and/or the domain owner information detection device 106 may be an equipment managed and operated by other third party service providers.

For another example, the security threat analysis device 116 may wait for a specific command issued by a professional cyber security analyst after the cyber security analyst conducts security threat evaluation on the suspect domain SD1 by utilizing various utilities or approaches. For example, the specific command may be a setting command for adding the suspect domain SD1 into a dangerous list with high security risk.

If the security threat analysis device 116 generates a specific risk evaluation result indicating that the suspect domain SD1 has high security risk, or the security threat analysis device 116 receives a setting command for adding the suspect domain SD1 into a dangerous list issued by the cyber security analyst, then the security threat analysis device 116 performs the operation 312.

In the operation 312, the security threat analysis device 116 may add the suspect domain SD1 into a dangerous list according to the aforementioned specific risk evaluation result or the setting command. In practice, after adding the suspect domain SD1 into the dangerous list, the security threat analysis device 116 may optionally remove the suspect domain SD1 from the alert list.

In the operation 314, the security threat analysis device 116 may transmit the dangerous list to the threat information updating devices 120, 130, and 140 through networks. In practice, the security threat analysis device 116 may transmit the most updated dangerous list to the threat information updating devices 120, 130, and 140 immediately once the contents of the dangerous list are changed. Alternatively, the security threat analysis device 116 may intermittently or periodically transmit the current dangerous list to the threat information updating devices 120, 130, and 140.

In the operation 316, the threat information updating devices 120, 130, and 140 may respectively utilize the communication circuits 122, 132, and 142 to receive the dangerous list transmitted from the security threat analysis device 116.

In the operation 318, the threat information updating devices 120, 130, and 140 may block the member devices in the corresponding client network system from accessing the domains in the dangerous list. For example, the processing circuit 124 of the threat information updating device 120 may directly block the access authority of all of the member devices in the client network system 150 regarding the domains in the dangerous list, or may instruct the corresponding network management device 152 to block the access authority of all of the member devices in the client network system 150 regarding the domains in the dangerous list.

Similarly, the processing circuit 134 of the threat information updating device 130 may directly block the access authority of all of the member devices in the client network system 160 regarding the domains in the dangerous list, or may instruct the corresponding network management device 162 to block the access authority of all of the member devices in the client network system 160 regarding the domains in the dangerous list. The processing circuit 144 of the threat information updating device 140 may directly block the access authority of all of the member devices in the client network system 170 regarding the domains in the dangerous list, or may instruct the corresponding network management device 172 to block the access authority of all of the member devices in the client network system 170 regarding the domains in the dangerous list.

As shown in FIG. 3, in the period during which the security threat analysis device 116 waits for the security threat evaluation result or a specific command regarding the suspect domain in the alert list, the security threat analysis device 116 may instruct the domain information monitoring device 112 to intermittently or periodically perform the operation 320.

In the operation 320, the domain information monitoring device 112 may inspect the current domain age of the respective suspect domains in the alert list. If the domain information monitoring device 112 finds out that the current domain age of a specific suspect domain in the alert list does not yet exceed a second threshold value, then the proactive suspicious domain alert system 110 may repeat the operation 310 and the operation 320. In this situation, the security threat analysis device 116 will keep the specific suspect domain in the alert list.

On the contrary, if the domain information monitoring device 112 finds out that the current domain age of the specific suspect domain in the alert list exceeds the aforementioned second threshold value, then the domain information monitoring device 112 informs the security threat analysis device 116 of the situation that the current domain age of the specific suspect domain exceeds the aforementioned second threshold value. In this situation, the security threat analysis device 116 performs the operation 322.

In the operation 322, the security threat analysis device 116 determines that the cyber security threat of the specific suspect domain is not high and removes the specific suspect domain from the alert list. Then, the security threat analysis device 116 performs the operation 304 to transmit the updated alert list to the threat information updating devices 120, 130, and 140.

The length of time of the aforementioned second threshold value is related to the length of observation time and the sensitivity of that the security threat analysis device 116 evaluates the domain threat risk of the suspect domain in the alert list. In practice, the second threshold value may be configured to be greater than or equal to the aforementioned first threshold value. In this embodiment, the second threshold value may be configured to have a length of time between twelve hours and two hundred hours, such as fifteen hours, eighteen hours, twenty-four hours, thirty-six hours, forty-eight hours, fifty hours, sixty hours, seventy-two hours, eighty hours, ninety-six hours, a hundred hours, a hundred and ten hours, a hundred and twenty hours, a hundred and fifty hours, a hundred and sixty-eight hours, a hundred and eighty hours, two hundred hours, or the like.

Take the aforementioned suspect domain SD1 that was added in the alert list as an example, before the domain age of the suspect domain SD1 exceeds the aforementioned second threshold value, the security threat analysis device 116 will keep the suspect domain SD1 in the alert list for evaluation as long as the security threat analysis device 116 has not yet generated a specific risk evaluation result indicating that the suspect domain SD1 has high security risk, nor receives a setting command issued by the cyber security analyst for adding the suspect domain SD1 into the dangerous list. In the meantime, the threat information updating devices 120, 130, and 140 keeps blocking the corresponding client network system from accessing the suspect domain SD1.

Please note that if the domain age of the suspect domain SD1 exceeds the second threshold value, but it is still not added into the dangerous list by the security threat analysis device, the security threat analysis device 116 would determine that the cyber security threat of the suspect domain SD1 is not high and would remove the suspect domain SD1 from the alert list. Such approach decreases the quantity of suspect domains in the alert list, which not only decreases the computing loadings, the storage requirements, and/or the memory requirements for the domain information monitoring device 112 and the security threat analysis device 116, but also decreases the computing loading, the storage requirement, and/or the memory requirement for the threat information updating devices 120, 130, and 140 when performing the aforementioned blocking operation in the operation 308. According to experimental tests, for example, by configuring the aforementioned second threshold value to have a length of time between twenty-four hours and a hundred and sixty-eight hours, the computing loadings, the storage requirements, and/or the memory requirements for the domain information monitoring device 112, the security threat analysis device 116, and the threat information updating devices 120, 130, and 140 may be effectively decreased without significantly degrading the security protection performance of the cyber security protection system 100, and thus the aforementioned devices are enabled to have more balanced configurations on protection performance and resource usage efficiency.

From another aspect, the aforementioned approach of removing the suspect domain from the alert list when appropriate conditions are fulfilled may also effectively improve the computing efficiency and reaction speed of the security threat analysis device 116 and the threat information updating devices 120, 130, and 140 when conducting related security analysis and comparison operations.

In addition, as can be appreciated from the foregoing descriptions, those domains listed in the alert list are domains to be temporarily blocked. As elaborated in the foregoing descriptions, if the domain age of a specific domain in the alert list exceeds the second threshold value, but the specific domain has not yet added into the dangerous list, then the security threat analysis device 116 will remove the specific domain from the alert list. As a result, the threat information updating devices 120, 130, and 140 will allow the member devices in the corresponding client network systems 150, 160, and 170 to access the specific domain.

In comparison, those domains listed in the dangerous list are domains to be chronically blocked or permanently blocked since those domains are determined as having high cyber security threat by the security threat analysis device 116 or other professional cyber security analysts.

Figure 4:
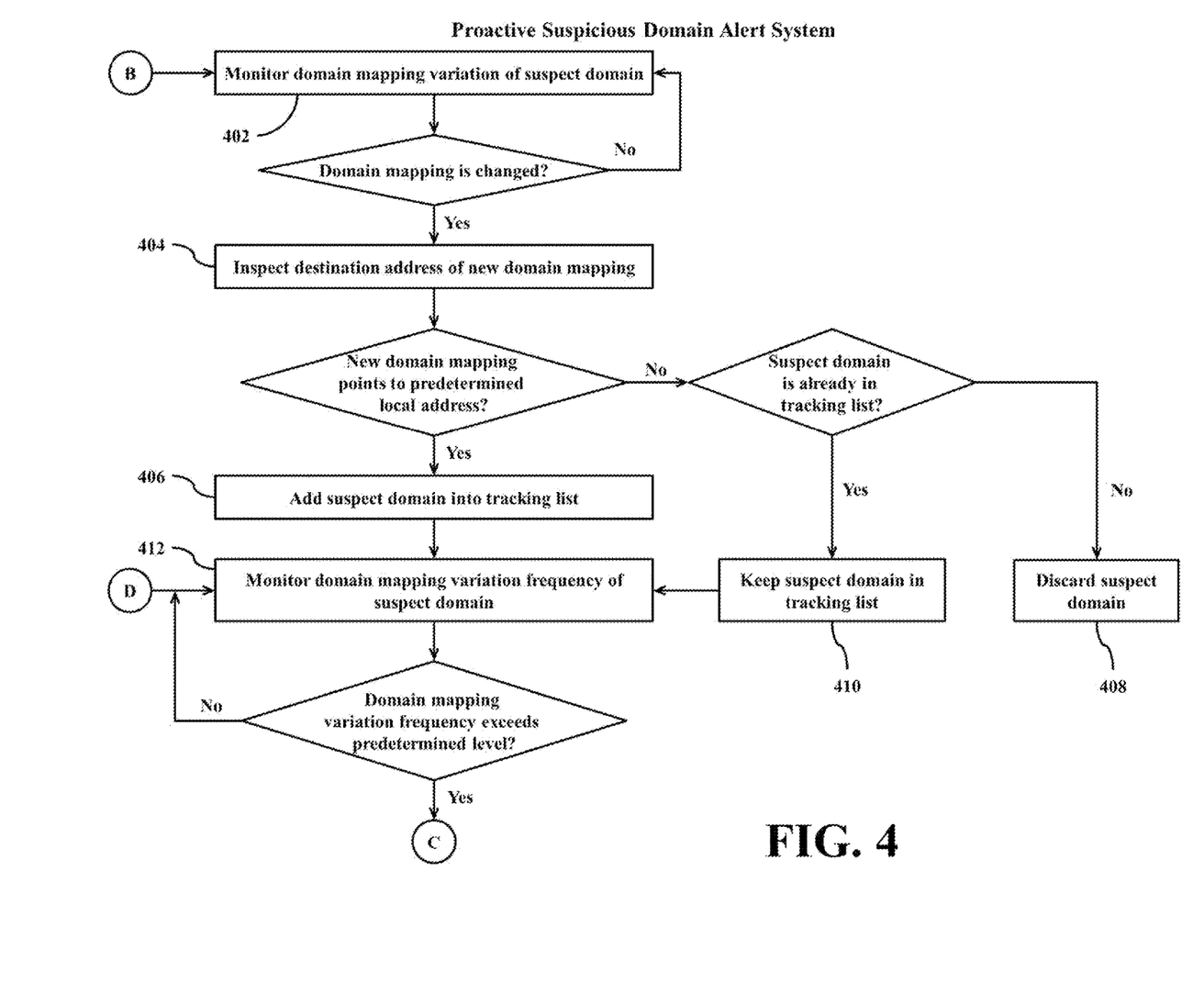
FIGS. 4-5 collectively show a simplified flowchart of a method for determining whether domains that have registered over a period of time have security threats according to one embodiment of the present disclosure.
Figure 5:
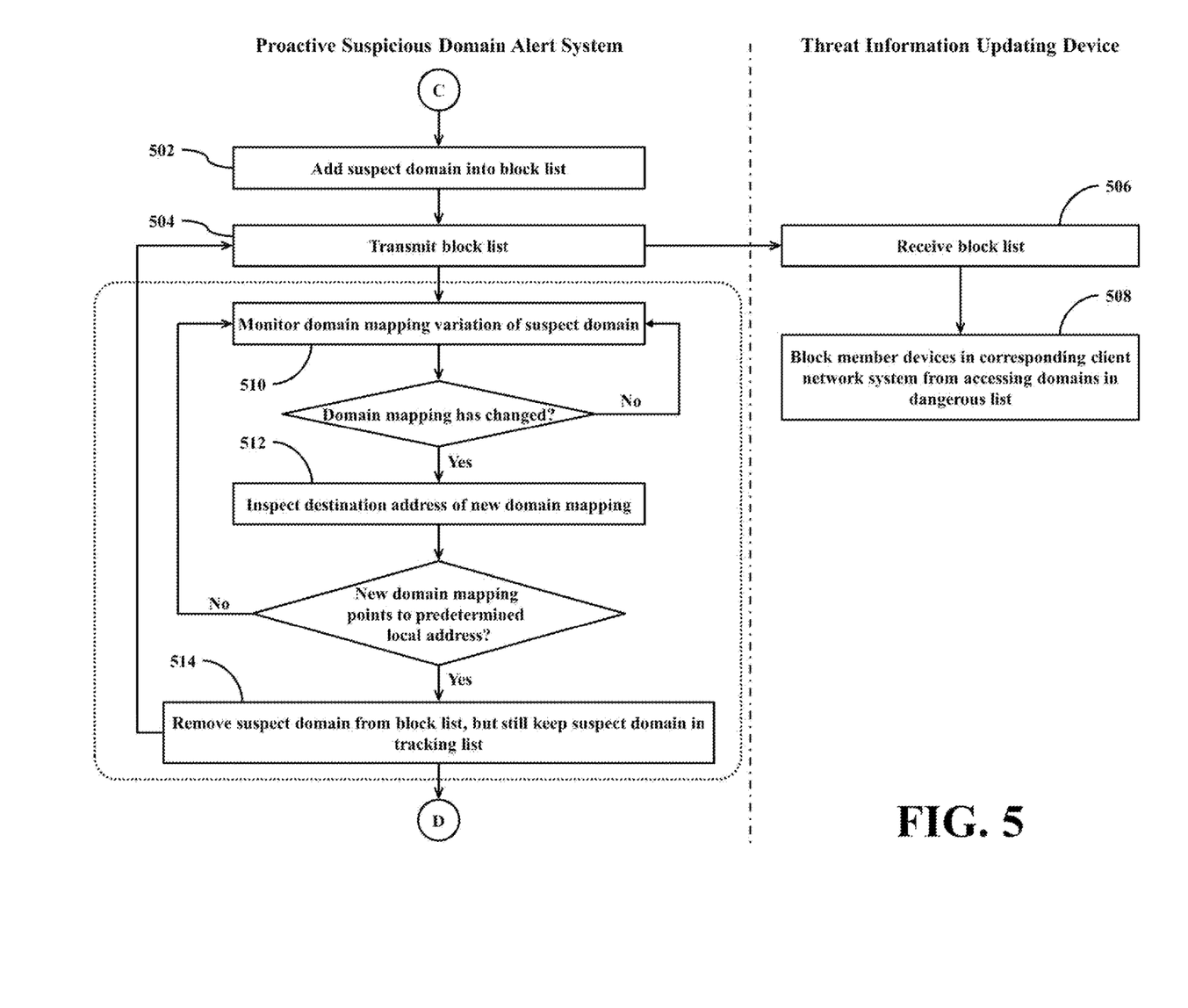

In the following, the operation of evaluating domain threat for domains with different properties conducted by the cyber security protection system 100 will be further described by reference to FIG. 4 through FIG. 5. FIGS. 4-5 collectively show a simplified flowchart of a method for determining whether domains that have registered over a period of time have security threats according to one embodiment of the present disclosure.

As can be appreciated from the foregoing descriptions of the operations in FIG. 2, if the domain ages of the suspect domains exceed the aforementioned first threshold value, but they have not yet accessed by any member device in any client network system, then the security threat analysis device 116 removes the suspect domains from the suspect list. From one aspect, the suspect domains are domains that have registered over a period of time (i.e., their domain ages exceed the aforementioned first threshold value), but not likely to have obvious cyber security risk concern so far.

However, hackers may use various skills and diversified approaches to conduct cyber attacks by utilizing malicious domains. It was found that sometimes the hacker may intentionally configure a domain mapping of a malicious domain to point to a local address of a member device that has been implanted with malicious program codes, thereby attempting to hide the malicious domain and/or the malicious program codes implanted in the member device. It is very difficult for the professional cyber security analysts and existing cyber security protection utilities to detect the existence of the malicious domain and the malicious program codes in the aforementioned scenario, because the malicious program codes implanted in the member device will not access the external malicious domain through networks for a certain period of time, which renders the malicious program codes to behave like staying in a sleep mode or incubation mode.

If the hacker changes the domain mapping of the malicious domain into an external IP address afterwards, the member device will easily suffer cyber attacks, and even spreads the attacks to other related devices.

In order to reduce the damage to the client network system that may possibly be caused by the aforementioned cyber attacks, the cyber security protection system 100 may adopt the method illustrated in FIGS. 4-5 to determine whether domains that have registered over a period of time have security threat or not.

As shown in FIG. 4, when the cyber security protection system 100 operates, the proactive suspicious domain alert system 110 may perform the operation 402 of FIG. 4. In the meantime, the threat information updating devices 120, 130, and 140 may keep operating according to the aforementioned method illustrated in the flowchart of FIG. 2-3, so as to block the member devices in the client network systems 150, 160, and 170 from accessing the domains in the aforementioned alert list and dangerous list.

In the operation 402, the domain information monitoring device 112 of the proactive suspicious domain alert system 110 may monitor the domain mapping variation of multiple suspect domains that have registered over a period of time (i.e., their domain ages exceed the aforementioned first threshold value). For example, the domain information monitoring device 112 may connect to websites or servers of various types of domain registration management institution, so as to search for the domain mapping information of the registered domains in a certain region, in some regions, or in the worldwide.

For another example, the domain information monitoring device 112 may connect to one or more domain name system monitoring devices 102 through a suitable private network or the internet, so as to receive the domain mapping information collected by the domain name system monitoring device 102. In practice, the aforementioned domain name system monitoring device 102 may be realized with various single processor module, a combination of multiple processor modules, a single computer system, a combination of multiple computer systems, a single server, a combination of multiple servers, or a cloud computing system having network connecting ability, computing ability, and data inspecting ability.

In one embodiment, the aforementioned domain mapping of the suspect domain comprises an A record of the suspect domain or an AAAA record of the suspect domain.

In another embodiment, in addition to the A record or the AAAA record, the aforementioned domain mapping of the suspect domain also comprises a NS record of the suspect domain and/or a MX record of the suspect domain.

If the domain mapping of the suspect domain does not change, then the domain information monitoring device 112 may repeat the operation 402, so as to intermittently or periodically inspect the domain mapping information of the suspect domain for multiple times in different time points afterwards, thereby monitoring whether the domain mapping of the suspect domain varies.

On the contrary, if the domain information monitoring device 112 finds out that the domain mapping of the suspect domain changes, then the domain information monitoring device 112 performs the operation 404 to further inspect whether a destination address of the new domain mapping of the suspect domain points to a predetermined local address or one of multiple predetermined local addresses. For example, the domain information monitoring device 112 may inspect whether the new domain mapping of the suspect domain points to a first predetermined local address "127.0.0.1", a second predetermined local address "0.0.0.0", or either one of the aforementioned two local addresses.

For the convenience of descriptions, it is assumed hereinafter that the suspect domain is the aforementioned suspect domain SD1.

If the domain information monitoring device 112 finds out that the new domain mapping of the suspect domain SD1 indeed points to the aforementioned first predetermined local address or second predetermined local address, then the domain information monitoring device 112 may store the related information of the suspect domain SD1 in the domain information storage device 114 and transmit a corresponding notification to the security threat analysis device 116. The security threat analysis device 116 then performs the operation 406 to add the suspect domain SD1 into a tracking list after receiving the notification.

On the contrary, if the domain information monitoring device 112 finds out that the new domain mapping of the suspect domain SD1 does not point to any predetermined local address, then the domain information monitoring device 112 may transmit the related information of the suspect domain SD1 to the security threat analysis device 116. The security threat analysis device 116 then further determines whether the suspect domain SD1 has been added into the tracking list after receiving the related information of the suspect domain SD1.

If the suspect domain SD1 has not been added into the tracking list, then the security threat analysis device 116 determines that the suspect domain SD1 does not have security threat, or that the security threat of the suspect domain SD1 is low. In this situation, the security threat analysis device 116 performs the operation 408 to discard the suspect domain SD1.

On the contrary, if the suspect domain SD1 is already in the tracking list, then the security threat analysis device 116 performs the operation 410 to keep the suspect domain SD1 in the tracking list.

The security threat analysis device 116 instructs the domain information monitoring device 112 to monitor a domain mapping variation frequency of each suspect domain that has been added or kept in the tracking list, so as to determine whether the domain mapping variation frequency of each suspect domain exceeds a predetermined level or not.

Therefore, the domain information monitoring device 112 performs the operation 412 for individual suspect domain in the tracking list to monitor the domain mapping variation frequency of the suspect domain.

Take the suspect domain SD1 as an example, the domain information monitoring device 112 may record the domain mapping variation history of the suspect domain SD1 and calculate the number of times that the domain mapping of the suspect domain SD1 changes in a predetermined length of time, so as to generate a corresponding domain mapping variation frequency of the suspect domain SD1 and compare the domain mapping variation frequency with the aforementioned predetermined level.

If the domain mapping variation frequency of the suspect domain SD1 does not exceed the aforementioned predetermined level, then the domain information monitoring device 112 may intermittently or periodically repeat the operation 412 to continue monitoring whether the domain mapping variation frequency of the suspect domain SD1 exceeds the aforementioned predetermined level, until the security threat analysis device 116 removes the suspect domain SD1 from the tracking list.

On the contrary, if the domain mapping variation frequency of the suspect domain SD1 exceeds the aforementioned predetermined level, then the domain information monitoring device 112 transmits a corresponding notification to the security threat analysis device 116.

In general, the managers or owners of most normal domains usually will not modify the domain mapping to point to a specific local address after the domain age of the domain exceeds a certain level (i.e., the aforementioned second threshold value). Moreover, neither would it make sense to frequently change the domain mapping after modifying the domain mapping to point to the specific local address for a while.

However, the domain mapping of the suspect domain SD1 is first changed to point to the aforementioned first predetermined local address or second predetermined local address, and then the domain mapping variation frequency exceeds the aforementioned predetermined level. This is apparently not a typical utilization pattern for a normal domain.

Therefore, after receiving the notification transmitted from the domain information monitoring device 112 which indicates the domain mapping variation frequency of the suspect domain SD1 exceeds the aforementioned predetermined level, the security threat analysis device 116 determines the suspect domain SD1 as a domain with cyber security risk. For example, the security threat analysis device 116 may determine that the suspect domain SD1 is a malicious domain that was deliberately hidden by hackers.

In this situation, the security threat analysis device 116 performs the operation 502 of FIG. 5 to add the suspect domain SD1 into a block list.

In the operation 504, the security threat analysis device 116 may transmit the block list to the threat information updating devices 120, 130, and 140 through networks. In practice, the security threat analysis device 116 may transmit the most updated block list to the threat information updating devices 120, 130, and 140 immediately once the contents of the block list are changed. Alternatively, the security threat analysis device 116 may intermittently or periodically transmit the current block list to the threat information updating devices 120, 130, and 140.

In the operation 506, the threat information updating devices 120, 130, and 140 may respectively utilize the communication circuits 122, 132, and 142 to receive the block list transmitted from the security threat analysis device 116.

In the operation 508, the threat information updating devices 120, 130, and 140 may block the member devices in the corresponding client network system from accessing the domains in the block list. For example, the processing circuit 124 of the threat information updating device 120 may directly block the access authority of all of the member devices in the client network system 150 regarding the domains in the block list, or may instruct the corresponding network management device 152 to block the access authority of all of the member devices in the client network system 150 regarding the domains in the block list.

Similarly, the processing circuit 134 of the threat information updating device 130 may directly block the access authority of all of the member devices in the client network system 160 regarding the domains in the block list, or may instruct the corresponding network management device 162 to block the access authority of all of the member devices in the client network system 160 regarding the domains in the block list. The processing circuit 144 of the threat information updating device 140 may directly block the access authority of all of the member devices in the client network system 170 regarding the domains in the block list, or may instruct the corresponding network management device 172 to block the access authority of all of the member devices in the client network system 170 regarding the domains in the block list.

In this embodiment, even if the aforementioned threat information updating devices 120, 130, and 140 do not transmit any domain accessing notification corresponding to the suspect domain SD1 or other security threat reference information to the security threat analysis device 116, as long as the domain information monitoring device 112's monitoring result regarding the domain mapping variation and the domain mapping variation frequency of the suspect domain SD1 meets the aforementioned conditions, the security threat analysis device 116 would add the suspect domain SD1 into the block list and transmit the block list to the threat information updating devices 120, 130, and 140, so as to cause the threat information updating devices 120, 130, and 140 to begin blocking the access authority of all of the member circuits in the client network systems 150, 160, and 170 regarding the suspect domain SD1.

In other words, even if the hackers attempt to hide the suspect domain SD1 and/or the malicious program codes implanted in the member device by purposely configuring the domain mapping of the suspect domain SD1 to point to the predetermined local address sometimes, as long as the domain mapping variation frequency of the suspect domain SD1 exceeds the predetermined level afterwards, the security threat analysis device 116 can still add the suspect domain SD1 into the block list.

As a result, it could destroy the attempt of hackers to try to hide the suspect domain SD1 and/or the malicious program codes, and could also create an obstacle for the cyber attacks to be conducted by hackers by utilizing the suspect domain SD1, thereby effectively increasing the difficulty for the hackers to conduct cyber attacks.

Furthermore, the aforementioned cyber security protection mechanism may increase the difficulty for the hackers to conduct cyber attacks by repeatedly utilizing the same suspect domain SD1 in different periods of time, and force the hackers to register more domains to use, so it can significantly increase the hackers' cost in implementing cyber attacks, thereby reducing the possibility of cyber attacks launched by the hackers.

From another aspect, the aforementioned proactive suspicious domain alert system 110 may provide proactive cyber security protection to the client network systems 150, 160, and 170, thereby improving the cyber security protection level for the client network systems 150, 160, and 170.

As shown in FIG. 5, the security threat analysis device 116 instructs the domain information monitoring device 112 to perform the operation 510 after adding the suspect domain SD1 into the block list, so as to keep monitoring the domain mapping variation of the suspect domain SD1.

The approaches adopted by the domain information monitoring device 112 to monitor the domain mapping variation of the suspect domain SD1 in the operation 510 is substantially the same as the aforementioned approaches adopted in the operation 402. For the sake of brevity, the descriptions will not be repeated here.

Similarly, if the domain information monitoring device 112 finds out that the domain mapping of the suspect domain SD1 changes again, then the domain information monitoring device 112 performs the operation 512 to further inspect whether the current destination address of the new domain mapping of the suspect domain SD1 points to the aforementioned first predetermined local address, or the aforementioned second predetermined local address, or any one of the aforementioned two predetermined local addresses.

If the domain information monitoring device 112 finds out that the new domain mapping of the suspect domain SD1 does not point to any predetermined local address, then the domain information monitoring device 112 repeats the operation 510 to keep monitoring the domain mapping variation of the suspect domain SD1. In this situation, the security threat analysis device 116 still keeps the suspect domain SD1 in the block list. Therefore, the threat information updating devices 120, 130, and 140 keep blocking all of the member devices in the client network systems 150, 160, and 170 from accessing the suspect domain SD1.

On the contrary, if the domain information monitoring device 112 finds out that the new domain mapping of the suspect domain SD1 again points to the aforementioned first predetermined local address or second predetermined local address, then the domain information monitoring device 112 will transmit a corresponding notification to the security threat analysis device 116. The security threat analysis device 116 then performs the operation 514 after receiving the notification.

In the operation 514, the security threat analysis device 116 determines that the former cyber security threats caused by the suspect domain SD1 are temporarily lifted. This is because of that the suspect domain SD1 temporarily will not cause substantial cyber security threats even if malicious program codes are implanted in the member devices as the malicious program codes temporarily will not access the external malicious domains after the new domain mapping of the suspect domain SD1 is changed to point to the aforementioned first predetermined local address or second predetermined local address.

Therefore, the security threat analysis device 116 removes the suspect domain SD1 from the block list in the operation 514, but still keeps the suspect domain SD1 in the tracking list. In this situation, the domain information monitoring device 112 repeats the aforementioned operation 412 to keep monitoring the domain mapping variation frequency of the suspect domain SD1.

As can be appreciated from the foregoing descriptions, if the domain mapping of the suspect domain SD1 is again changed to point to the aforementioned first predetermined local address or second predetermined local address after the suspect domain SD1 is added into the block list, then the security threat analysis device 116 determines that the cyber security threats caused by the suspect domain SD1 are temporarily lifted. Accordingly, the security threat analysis device 116 removes the suspect domain SD1 from the block list. Such approach decreases the quantity of suspect domains in the block list, which not only decreases the computing loadings, the storage requirements, and/or the memory requirements for the domain information monitoring device 112 and the security threat analysis device 116, but also decreases the computing loading, the storage requirement, and/or the memory requirement for the threat information updating devices 120, 130, and 140 when they perform the aforementioned blocking operation in the operation 508.

From another aspect, the aforementioned approach of removing a suspect domain from the block list when appropriate conditions are fulfilled can also effectively improve the computing efficiency and reaction speed of the security threat analysis device 116 and the threat information updating devices 120, 130, and 140 when conducting related security analysis and comparison operations.

In addition, as can be appreciated from the flowcharts in FIG. 4 through FIG. 5, if the domain information monitoring device 112 finds out that the domain mapping variation frequency of the suspect domain SD1 exceeds the predetermined level once again, then the security threat analysis device 116 will perform the operation 502 of FIG. 5 again to timely add the suspect domain SD1 into the block list again. In this situation, the threat information updating devices 120, 130, and 140 begin to block the access authority of all of the member circuits in the client network systems 150, 160, and 170 regarding the suspect domain SD1 again.

Therefore, even if the suspect domain SD1 is truly a malicious domain utilized by hackers to conduct the cyber attack, a test domain utilized by hackers to test the trojan, or a malicious domain to which the malicious program codes implanted in a certain user device want to connect, it is difficult for the suspect domain SD1 to cause further damage to the other member devices in the client network systems 150, 160, and 170, since the security threat analysis device 116 would timely update the security threat intelligence (i.e., the block list) to be provided to the threat information updating devices 120, 130, and 140, and thus the damage that may be caused to the client network systems 150, 160, and 170 by the suspect domain SD1 can be effectively restricted in a very limited scope.

By adopting the aforementioned approaches in the FIG. 4 through FIG. 5, the proactive suspicious domain alert system 110 has a chance to render the threat information updating devices 120, 130, and 140 to begin to block all of the member devices in the client network systems 150, 160, and 170 from accessing the suspect domain SD1 before the suspect domain SD1 causes substantial damage. As a result, the aforementioned security protection mechanism adopted by the cyber security protection system 100 may be able to completely suppress the cyber attacks that hackers would like to conduct by utilizing the suspect domain SD1.

From another aspect, by adopting the aforementioned approaches in FIG. 4 through FIG. 5 to evaluate whether a suspect domain that has registered over a period of time has potential cyber security threats, it could create an obstacle for the cyber attacks conducted by hackers by utilizing old domains, thereby effectively increasing the difficulty for the hackers to conduct cyber attacks.

Obviously, the aforementioned cyber security protection mechanism will force the hackers to register more domains to use, so it can significantly increase the hackers' cost in implementing cyber attacks, thereby reducing the possibility of cyber attacks launched by the hackers.

Therefore, the aforementioned proactive suspicious domain alert system 110 may provide proactive cyber security protection to the client network systems 150, 160, and 170, thereby improving the cyber security protection level for the client network systems 150, 160, and 170.

Please note that the architecture of the aforementioned cyber security protection system 100 is merely an exemplary embodiment, rather than a restriction to the practical implementations. For example, the functionalities of the aforementioned domain name system monitoring device 102, suspicious domain information collection device 104, and/or domain owner information detection device 106 may be integrated into the domain information monitoring device 112. In this situation, the functional blocks of the domain name system monitoring device 102, the suspicious domain information collection device 104, and/or the domain owner information detection device 106 in FIG. 1 may be omitted.

For another example, the functionalities of the network management devices 152, 162, and 172 may be respectively integrated into the corresponding threat information updating devices 120, 130, and 140. In this situation, the functional blocks of the network management devices 152, 162, and 172 in FIG. 1 may be omitted.

In addition, the operations of FIG. 4 through FIG. 5 are conducted after the operations of FIG. 2 in the aforementioned embodiments, but this is merely an exemplary embodiment, rather than a restriction to the practical implementations. For example, the cyber security protection system 100 may directly determine domains that have been registered over a period of time (i.e., their domain ages exceed the aforementioned first threshold value) as suspect domains and evaluate the security threats of the suspect domains by adopting the aforementioned approaches in FIG. 4 through FIG. 5, without performing the aforementioned operations in FIG. 2 or FIG. 3 to the suspect domains in advance.

In some applications, the aforementioned operation 204 of FIG. 2 may be omitted to mitigate the computing loading of the threat information updating devices 120, 130, and 140. As a result, the threat information updating devices 120, 130, and 140 may be realized with simpler hardware structures, software modules, or cloud modules.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

The invention claimed is:

1. A cyber security protection system, comprising:
   a plurality of threat information updating devices, arranged to respectively monitor networking behaviors of a plurality of client network systems; and
   a proactive suspicious domain alert system, comprising:
     a domain information monitoring device, arranged to operably monitor domain mapping variation of a suspect domain, wherein a domain age of the suspect domain is greater than seventy-two hours;
     a domain information storage device, coupled with the domain information monitoring device, and arranged to operably store monitoring records generated by the domain information monitoring device; and
     a security threat analysis device, coupled with the domain information monitoring device and the domain information storage device, and arranged to operably conduct data transmission with the plurality of threat information updating devices through networks,
   wherein if the domain information monitoring device finds out that a domain mapping of the suspect domain is changed, and a new domain mapping of the suspect domain points to a predetermined local address or one of a plurality of predetermined local addresses, then the domain information monitoring device monitors a domain mapping variation frequency of the suspect domain, and
   wherein if the domain information monitoring device determines that the domain mapping variation frequency of the suspect domain exceeds a predetermined level, then the security threat analysis device adds the suspect domain into a block list to render the plurality of threat information updating devices to block member devices within the plurality of client network systems from accessing domains in the block list.

2. The cyber security protection system of claim 1, wherein the domain information monitoring device is further arranged to operably keep monitoring the domain mapping variation of the suspect domain after the suspect domain is added into the block list, and if the domain information monitoring device finds out that the domain mapping of the suspect domain is changed and a new domain mapping of the suspect domain points to a predetermined local address or one of the plurality of predetermined local addresses, then the security threat analysis device removes the suspect domain from the block list, so as to decrease computing loadings and storage requirements for the domain information monitoring device, the security threat analysis device, and the plurality of threat information updating devices.

3. The cyber security protection system of claim 2, wherein before the suspect domain is added into the block list, if the domain information monitoring device finds out that the domain mapping of the suspect domain is changed, a new domain mapping of the suspect domain does not point to a predetermined local address nor any of the plurality of predetermined local addresses, and the suspect domain is not added into a tracking list by the security threat analysis device, then the domain information monitoring device discards the suspect domain.

4. A proactive suspicious domain alert system for providing a block list to a plurality of threat information updating devices, the plurality of threat information updating devices being respectively utilized to monitor networking behaviors of a plurality of client network systems, the proactive suspicious domain alert system comprising:
   a domain information monitoring device, arranged to operably monitor a domain mapping variation of a suspect domain, wherein a domain age of the suspect domain is greater than seventy-two hours;
   a domain information storage device, coupled with the domain information monitoring device, and arranged to operably store monitoring records generated by the domain information monitoring device; and
   a security threat analysis device, coupled with the domain information monitoring device and the domain information storage device, and arranged to operably conduct data communication with the plurality of the threat information updating devices through networks,
   wherein if the domain information monitoring device finds out that a domain mapping of the suspect domain is changed, and a new domain mapping of the suspect domain points to a predetermined local address or one of a plurality of predetermined local addresses, then the domain information monitoring device monitors a domain mapping variation frequency of the suspect domain, and
   wherein if the domain information monitoring device determines that the domain mapping variation frequency of the suspect domain exceeds a predetermined level, then the security threat analysis device adds the suspect domain into the block list to render the plurality of threat information updating devices to block member devices within the plurality of client network systems from accessing domains in the block list.

5. The proactive suspicious domain alert system of claim 4, wherein the domain information monitoring device is further arranged to operably keep monitoring the domain mapping variation of the suspect domain after the suspect domain is added into the block list, and if the domain information monitoring device finds out that the domain mapping of the suspect domain is changed and a new domain mapping of the suspect domain points to a predetermined local address or one of the plurality of predetermined local addresses, then the security threat analysis device removes the suspect domain from the block list, so as to decrease computing loadings and storage requirements for the domain information monitoring device, the security threat analysis device, and the plurality of threat information updating devices.

6. The proactive suspicious domain alert system of claim 5, wherein before the suspect domain is added into the block list, if the domain information monitoring device finds out that the domain mapping of the suspect domain is changed, a new domain mapping of the suspect domain does not point to a predetermined local address nor any of the plurality of predetermined local addresses, and the suspect domain is not added into a tracking list by the security threat analysis device, then the domain information monitoring device discards the suspect domain.

* * * * *